(12) United States Patent
Hein

(10) Patent No.: US 11,302,930 B2
(45) Date of Patent: Apr. 12, 2022

(54) ACTIVATION DEVICE FOR A BATTERY FOR AN ELECTRONIC IGNITION MECHANISM AND BATTERY

(71) Applicant: DIEHL & EAGLE PICHER GMBH, Roethenbach (DE)

(72) Inventor: Roland Hein, Nuremberg (DE)

(73) Assignee: Diehl & Eagle Picher GmbH, Roethenbach (DE)

( * ) Notice: Subject to any disclaimer, the term of this patent is extended or adjusted under 35 U.S.C. 154(b) by 237 days.

(21) Appl. No.: 16/458,373

(22) Filed: Jul. 1, 2019

(65) Prior Publication Data

US 2020/0006785 A1 Jan. 2, 2020

(30) Foreign Application Priority Data

Jun. 29, 2018 (DE) .......................... 102018005202.9

(51) Int. Cl.
*H01M 6/38* (2006.01)
*F16F 1/02* (2006.01)
*F16F 1/18* (2006.01)
*H01M 6/32* (2006.01)

(52) U.S. Cl.
CPC ............... *H01M 6/38* (2013.01); *F16F 1/027* (2013.01); *F16F 1/18* (2013.01); *H01M 6/32* (2013.01)

(58) Field of Classification Search
CPC ............ H01M 6/30; H01M 6/32; H01M 6/38; H01M 6/03; F16F 1/027; F16F 1/18
See application file for complete search history.

(56) References Cited

U.S. PATENT DOCUMENTS

| 2,918,516 | A | 12/1959 | Everett |
| 6,673,486 | B2 | 1/2004 | Ruedenauer et al. |
| 8,007,934 | B2 | 8/2011 | Glatthaar et al. |
| 8,372,531 | B1 | 2/2013 | Allen et al. |
| 8,785,028 | B1* | 7/2014 | Saiki .................. H01M 50/124 429/121 |
| 2002/0034681 | A1* | 3/2002 | Rudenauer .............. H01M 6/38 429/114 |

FOREIGN PATENT DOCUMENTS

| CH | 297558 | A | 3/1954 |
| DE | 10038066 | A1 | 3/2002 |
| DE | 102006045953 | B3 | 6/2008 |
| EP | 1467423 | A2 | 10/2004 |

* cited by examiner

*Primary Examiner* — Maria Laios
*Assistant Examiner* — Adam J Francis
(74) *Attorney, Agent, or Firm* — Laurence A. Greenberg; Werner H. Stemer; Ralph E. Locher

(57) ABSTRACT

An activation device for a battery for an electronic ignition mechanism has an ampoule filled with an electrolyte and a device for breaking the ampoule. The breaking device contains two leaf spring elements, which are fixed with a prestress on a component in the housing interior and between which the ampoule is clamped. At least the leaf spring element which supports the ampoule on the bottom side snaps from a first shape into a second shape when a force due to acceleration is applied.

11 Claims, 2 Drawing Sheets

ACTIVATION DEVICE FOR A BATTERY FOR AN ELECTRONIC IGNITION MECHANISM AND BATTERY

CROSS-REFERENCE TO RELATED APPLICATION

This application claims the priority, under 35 U.S.C. § 119, of German application DE 10 2018 005 202.9, filed Jun. 29, 2018; the prior application is herewith incorporated by reference in its entirety.

BACKGROUND OF THE INVENTION

Field of the Invention

The invention relates to an activation device for a battery for an electronic ignition mechanism, containing an ampoule filled with an electrolyte and a device for breaking the ampoule.

Such an activation device is used to actuate a battery for an electronic ignition mechanism of a projectile weapon, which can be launched through a weapon tube. Such an activation device is described for example in published European patent application EP 1 467 423 A2, corresponding to U.S. patent publication No. 2004/0197640. Upon launching, the activation device is actuated, so that the ampoule is broken and the electrolyte electrically activates the neighbouring battery cell.

Besides the ampoule, the activation mechanism as known for example from EP 1 467 423 A2 also contains a corresponding device for breaking the ampoule. To this end, the ampoule is mounted on a preferably annular supporting element, connected by a few narrow connecting struts to a carrier that is arranged inside the annular supporting element, and is therefore positioned below the ampoule. If the projectile weapon is then launched, because of acceleration a high force acts on the ampoule and via the latter on the supporting element, the effect of which is that the connecting struts are sheared off, and the ampoule is released so that it strikes against the carrier, which leads to breaking of the ampoule and therefore activation of the battery by the electrolyte flowing out. In order to obtain this activation, a trigger threshold needs to be exceeded, i.e. a sufficient force action needs to be achieved by the launch acceleration, so that the connecting struts are sheared off and breaking of the ampoule takes place. The activation is assisted by a resilient element, arranged above the ampoule, which is braced between the upper side of the ampoule and a housing top and exerts a prestress force on the ampoule and therefore on the supporting element.

Besides intentional activation beyond a particular acceleration level, for safety reasons it is however also necessary to ensure nonactivation in cases in which, although there is acceleration, it is not intended, for example when the projectile weapon falls onto the ground. A considerable acceleration may sometimes also occur in this case, although this must in no event lead to triggering. For safety reasons, the trigger threshold should therefore be relatively high. Conversely, however, a relatively low trigger threshold is often required, particularly when the launching takes place with a low launch acceleration. Such low launch accelerations are about 1,000-2,000 times the acceleration due to gravity. Compared with this, much higher accelerations occur during corresponding drop tests.

EP 1 467 423 A2 counters this problem by a correspondingly highly configured trigger threshold, by the connecting struts being configured in such a way that they only shear off at high acceleration, for example 5,000 times the acceleration due to gravity. This means that a relatively high trigger threshold is produced in this case. Such a relatively high trigger threshold is to be selected there since the impulse suppression capability of the shear connection is relatively low.

As described, in the activation device known from EP 1 467 423 A2, a resilient clamping element is arranged between the housing top and the ampoule top, which clamps the ampoule against the annular supporting element. The cell stacks are, annularly enclosing the ampoule and the supporting element, arranged in the housing and axially braced with a corresponding pressure. On the lower side, they are mounted on a corresponding annular carrier, and on the upper side the housing, usually a sheet-metal housing, itself forms the closure. By means of this clamping between the annular carrier and the housing, a defined pressure is applied on the cell stack. This required pressure, or the clamping, therefore determines the overall height of the battery. The overall height is, however, determined by the tolerances of each individual component in the chain. This leads to different heights, or pressures on the cell stack, during series production of the batteries. The different battery or housing heights may, however, have a detrimental effect on the activation device, or its function, and in particular the trigger threshold. As mentioned, the resilient clamping element is braced between the housing top and the ampoule top. If the distance between the housing top and the ampoule top then varies slightly, the pressure with which the clamping element loads the ampoule, or clamps it against the supporting element, necessarily varies as well. The supporting element, and therefore the intended breaking positions, are consequently sometimes loaded differently, which in turn affects the trigger threshold since this may indeed be different from battery to battery depending on the given tolerances.

SUMMARY OF THE INVENTION

The object of the invention is therefore to provide an activation device which is improved in comparison therewith.

In order to achieve this object, it is proposed according to the invention that, in the case of an activation device of the type mentioned in the introduction, the breaking device contains two leaf spring elements, which are fixed with a prestress on a common component in the housing interior and between which the vessel is clamped, at least the leaf spring element which supports the ampoule on the bottom side snapping from a first shape into a second shape when a force due to acceleration is applied.

According to the invention, the ampoule is clamped between two leaf spring elements, i.e. thereby fixed. The two leaf spring elements are arranged on a common component in the housing interior and fixed in a prestressed form. This advantageously makes it possible to fully decouple the fixing of the ampoule from the arrangement of the cells, or the bracing of the cells. The fixing of the ampoule is therefore independent, and is fully decoupled from the actual overall height of the housing, so that any variations within the overall height in no event affect the mounting of the ampoule and therefore the trigger threshold defined thereby.

The trigger threshold is essentially defined by the leaf spring element supporting the ampoule on the bottom side. This leaf spring element is prestressed and arranged in such a way that, when a sufficiently high force due to gravity is applied, it snaps from a first shape, in which the ampoule is fixed, into a second shape. It is thus configured as a catch spring element which switches its shape. Starting from the initial state in which no force is exerted on the activation adjustment, and in which the leaf spring element is in a first shape, in the event of a sufficiently high force it snaps into the second shape, destruction of the ampoule and therefore release of the electrolyte also being associated with this snapping process.

By means of the mechanical properties of the lower leaf spring element, or catch spring element, the trigger threshold can be adjusted in a defined way, i.e. the force level and the duration of the force action can be established. That is to say, the leaf spring element can be configured in such a way that only a brief force impulse, as for example acts for only a few µs in the scope of a drop test, is not sufficient to initiate the snapping process. In this case, a slight springing movement may occur, which is not however sufficient to snap over.

Restoring takes place after the end of the brief acceleration, that is to say the leaf spring element returns into the first shape.

Only when a sufficient force, resulting from the acceleration, is applied for a sufficient time does the shape change of the leaf spring element take place, associated with the breaking of the ampoule, which usually consists of glass. This means that the leaf spring element is a mechanical integrator, which integrates the acceleration force over time. By configuration of the leaf spring element in terms of its spring properties, the thickness, the geometry, etc., it is in this case possible to adjust the spring characteristic as well as the distance which needs to be travelled until the snapping point is reached.

Overall, the activation device consequently allows full decoupling of the mounting or fixing of the ampoule in the housing interior from the arrangement, configuration and bracing of the cell stack, and therefore also decoupling of the trigger threshold, adjusted by the activation device, from any housing geometry variations, while simultaneously ensuring a sufficiently high trigger threshold and sufficient protection against unintended actuation thereof, for example in the event of a drop acceleration.

The two leaf spring elements are expediently prestressed oppositely to one another, that is to say the upper leaf spring element presses the ampoule against the lower leaf spring element, and vice versa. Necessarily in this case, only the lower leaf spring element snaps over in the event of a sufficient acceleration.

As an alternative, it is conceivable for the two leaf spring elements to be prestressed in the same sense and to snap simultaneously from the first to the second shape when a force due to acceleration is applied.

In order to ensure the breaking in the event of actuation of the activation device, i.e. when the lower leaf spring element snaps over, a breaking element, on which the ampoule impacts after the leaf spring element snaps into the second shape, is expediently arranged below the ampoule. This breaking element is, for example, a metal pin or the like.

In another configuration of the invention, the leaf spring elements may respectively contain a central disc section and a plurality of spring sections protruding radially therefrom, by which they are respectively supported on a wall of the component enclosing the leaf spring elements. In this case, three or more spring sections arranged equidistantly distributed around the circumference of the round central section may preferably be provided. By means of these spring sections, which preferably engage in recesses provided on the component, the heightwise fixing and support of the leaf spring elements on the surrounding component takes place.

The recesses, in which the spring sections engage, are configured in such a way that mobility of the spring sections is provided, which permits snapping at least of the lower leaf spring element. That is to say, this recess or the recesses are configured substantially as a wedge-shaped notch or notches, or the like. For example, a corresponding circumferential wedge groove may be formed on the surrounding component, in which the spring sections engage and on which they bear in the first shape from which they switch into the second shape when snapping over, while moving inside the recess. As an alternative, separate individual notches may also be envisaged.

The component supporting the leaf spring elements is preferably a sleeve, into which the ampoule as well as the leaf spring elements are fitted. The sleeve itself is preferably supported on a base of the battery or the like, and has no further connection to one of the other housing sections, in order to permit the decoupling described in the introduction.

The catch spring element itself is preferably made of metal, in particular spring steel, although an embodiment made of a polymer or other resilient materials may also be envisaged.

Besides the activation device itself, the invention furthermore relates to an activatable battery for an electronic ignition mechanism, in particular for an artillery munition, containing an activation device of the type described above.

Other features which are considered as characteristic for the invention are set forth in the appended claims.

Although the invention is illustrated and described herein as embodied in an activation device for a battery for an electronic ignition mechanism, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
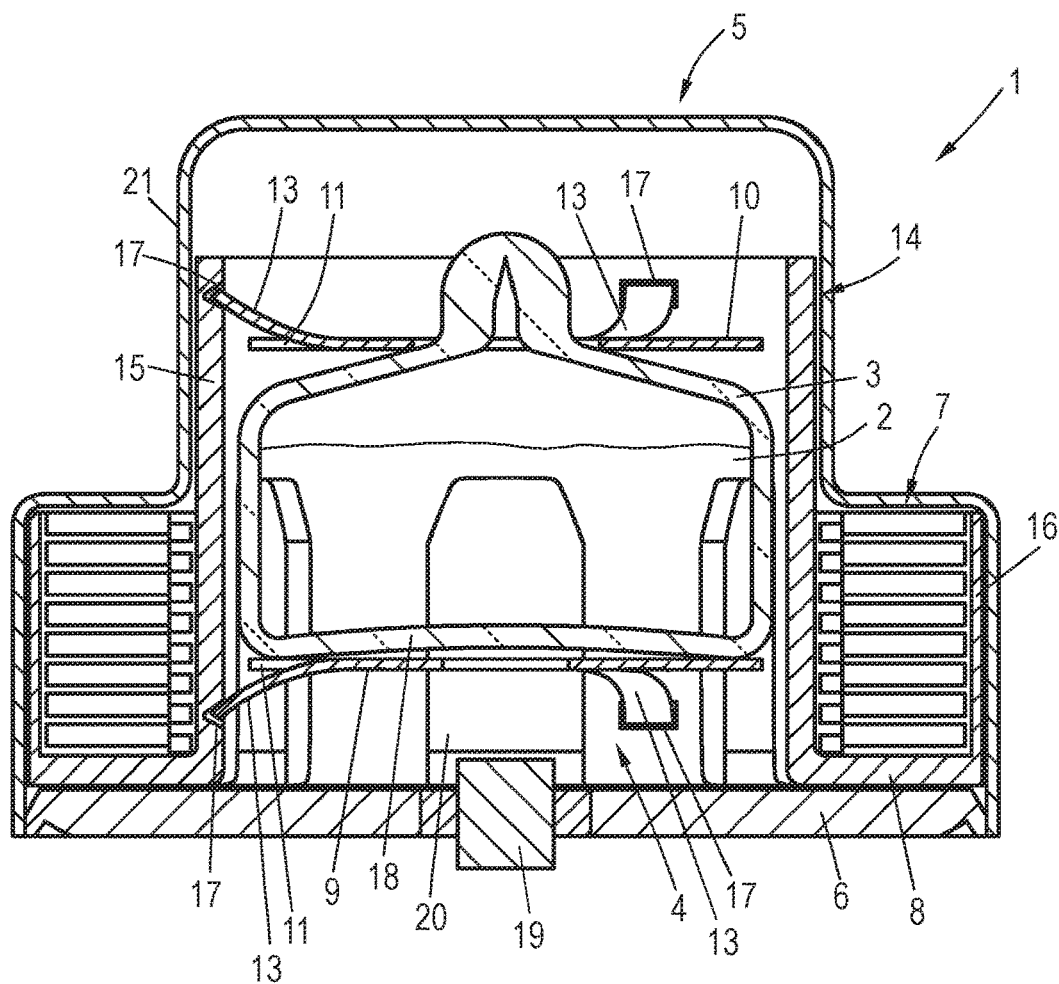
FIG. 1 is a diagrammatic, sectional view of an activatable battery according to the invention, as well as an activation device according to the invention.

Referring now to the figures of the drawings in detail and first, particularly to FIG. 1 thereof, there is shown a battery 1 according to the invention with an activation device according to the invention, which contains an ampoule 3, in particular made of glass, which is filled with an electrolyte 2 and has been fused after filling with the electrolyte 2. A device 4 for breaking the ampoule 3 is furthermore provided.

The ampoule 3 and the device 4 for breaking the ampoule 3 are arranged in a housing 5, containing a base 6 and a pot-shaped housing component 21, conventionally drawn from a metal sheet. This is widened peripherally in order to form a reception space for a cell stack 7 containing a multiplicity of individual cells which can be activated by the electrolyte. These cells 7 are axially braced on the one hand between a lower bearing section 8, which is part of a sleeve yet to be described below, and the housing component 21.

The device 4 for breaking the ampoule 3 contains a first leaf spring element 9 and a second leaf spring element 10, between which the ampoule 3 is braced. The lower leaf spring element 9 is used substantially as a platform on which the ampoule 3 is supported.

Each leaf spring element 9, 10 contains a central round disc section 11 (see FIG. 3), which has a hole 12 in the middle. In the example shown, it furthermore contains three spring sections 13 stamped from the disc section 11, which as seen radially are longer than the disc section 11, i.e. they protrude laterally therefrom. By means of the spring sections 13, the leaf spring elements 9, 10 are fastened and braced on a common component 14, as shown by FIGS. 1 and 2.

The common component 14 is or contains a sleeve 15, which is received inside the housing 4. In the example shown, the sleeve 15 merges into the bearing section 8 on which the cell stack 7 is received. The section 8 merges into a further annular section 16, which radially engages around the cell stack 7.

Corresponding notch-shaped recesses 17, in which the spring sections 13 are received, are formed on the sleeve 15. The diameter of the sleeve 15 is in this case smaller than the outer radius which the spring sections 13 define, so that the spring sections 13, as clearly shown by FIGS. 1 and 2, are curved, and the respective leaf spring element 9, 10 is consequently stressed. The two leaf spring elements 9, 10 stressed counter to one another can be seen in FIG. 1. The lower leaf spring element 9 carries the ampoule 3 on its disc section 11, i.e. it is placed with the ampoule bottom 18 on the disc section 11. The disc section 11 of the upper leaf spring element 10 bears on the upper side of the ampoule 3, the tip of which engages through the hole 12. That is to say, the ampoule 3 is clamped between the two oppositely stressed leaf spring elements 9, 10.

Figure 2:
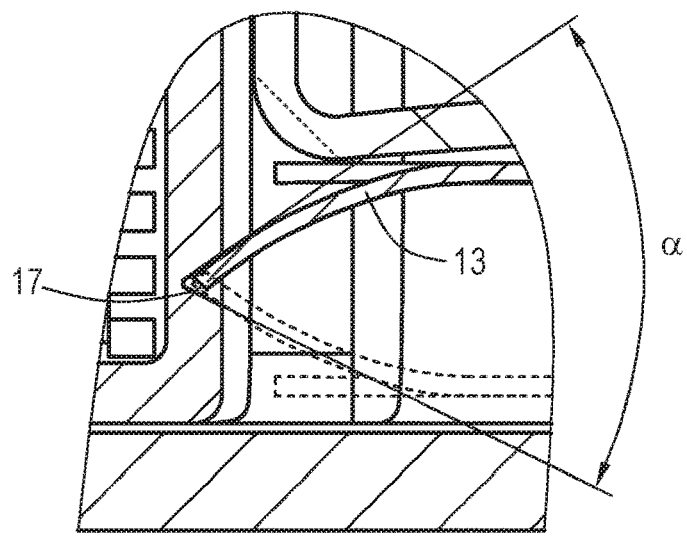
FIG. 2 is an enlarged, sectional view of a part of FIG. 1.
Figure 3:
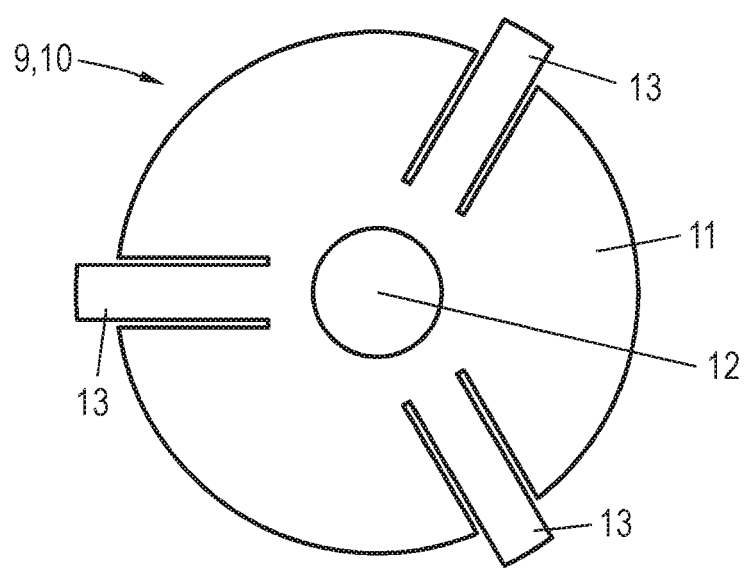
FIG. 3 is a plan view of a leaf spring element.

At least the lower recesses 17, in which the spring sections 13 of the lower leaf spring element 9 are received, are configured to be essentially wedge-shaped, as shown particularly in FIG. 2. The aperture angle α, which the wedge-shaped recesses 17 define, is for example 60°. This makes it possible for the lower leaf spring element to be able to snap from the first shape, shown in FIG. 1, into the second shape, shown by dashes in FIG. 2. This occurs when, for example because of a launch of a projectile weapon which contains the battery 1, a sufficiently high force due to acceleration acts on the ampoule 3 and, via the latter, on the lower leaf spring element 9, so that it snaps from the position shown by a solid line in FIGS. 1 and 2 into the position shown by dashes in FIG. 2. This means that the bottom-side leaf spring element 9 carrying the ampoule 3 changes its position and the ampoule 3 is consequently no longer supported on the bottom side. During the snapping over, the disc section 11, arranged on the bottom, of the lower leaf spring element 9 moves in the direction of the base 6, and a breaking element 19 engages through the central hole 12. The effect of this is that the bottom 18 of the ampoule 3 strikes against the breaking element 19, for example a metal pin, with the result that the ampoule 3, which usually consists of glass, breaks and the electrolyte can flow through openings 20 in the sleeve 15, a plurality of which are provided over the circumference, to the cell stack 7.

By means of the aperture angle of the notch-shaped recesses 17, it is also possible to adjust the travel which the lower leaf spring element 9 executes when snapping over. By corresponding selection of the leaf spring material, its thickness and the length of the spring sections 13, the spring characteristic, or the mechanical properties of the respective leaf spring element, can be adjusted overall, and the snapping point can thus also be defined.

Although the two leaf spring elements 9, 10 are braced counter to one another in the exemplary embodiment according to FIG. 1, it is also conceivable to brace them in the same sense, i.e. to brace the upper leaf spring element 10 in the same way as the lower leaf spring element 9. In this case, in the event of a sufficiently high force due to acceleration with a defined weight component, not only the lower leaf spring element 9 but also the upper leaf spring element 10 switches its shape and snaps over in corresponding notch-shaped recesses 17. In this case, the trigger threshold is consequently defined not only by means of the lower leaf spring element, or its spring properties, but in addition also by means of the upper leaf spring element 10.

As described in detail above, the activation device is fastened or "suspended" exclusively on the sleeve 15. Other than with the base 6, there is no connection to the housing component 21.

The effect of this is that the activation device is fully decoupled from the housing component 21. The position of the housing component 21, and therefore the height of the battery 1, may vary slightly because of certain tolerances within the cell stack 7, which is axially braced by the housing component 21. Such a variation does not, however, affect the activation device, and therefore in particular does not affect the trigger threshold defined by means of the activation device, or in particular by means of the lower leaf spring element 9. This makes it possible that, within series production of such batteries 1, it is possible to ensure that the trigger threshold is always the same, irrespective of whether the housing height does in fact possibly vary from battery 1 to battery 1 because of certain tolerances.

The leaf spring elements 9, 10 are preferably made of spring steel, which may be stamped by stamping in a straightforward way in the corresponding shape with the disc section 11 and the stamped spring sections 13 provided therein, and the central hole 12.

The following is a summary list of reference numerals and the corresponding structure used in the above description of the invention:

1 battery
2 electrolyte
3 ampoule
4 device for breaking the ampoule
5 housing
6 base
7 cell stack
8 bearing section
9 leaf spring element
10 leaf spring element
11 disc section
12 hole
13 spring section
14 component
15 sleeve
16 annular section
17 recesses
18 bottom
19 breaking element
20 opening
21 housing component

The invention claimed is:

1. An activation device for a battery for an electronic ignition mechanism, the activation device comprising:
   a common component;
   an ampoule filled with an electrolyte; and
   a breaking device for breaking said ampoule, said breaking device having two leaf spring elements, fixed with a prestress on said common component in a housing interior of the battery and between said leaf spring elements said ampoule is clamped, one of said leaf spring elements supporting said ampoule on a bottom side snapping from a first shape into a second shape when a force due to acceleration is applied;
   said leaf spring elements respectively containing a central disc section and a plurality of spring sections protruding radially therefrom, by means of said spring sections said leaf spring elements are respectively supported on a wall of said common component enclosing said leaf spring elements.

2. The activation device according to claim 1, wherein said two leaf spring elements are prestressed oppositely to one another.

3. The activation device according to claim 1, wherein said two leaf spring elements are prestressed in a same sense and snap simultaneously from the first shape into the second shape when the force due to the acceleration is applied.

4. The activation device according to claim 1, further comprising a breaking element, on which said ampoule impacts after at least one of said leaf spring elements snaps into said second shape, said breaking element is disposed below said ampoule.

5. The activation device according to claim 1, wherein said leaf spring elements have at least three said spring sections disposed equidistantly distributed around a circumference of said central disc section being a round disc section.

6. The activation device according to claim 1, wherein said common component has at least one recess formed therein, said spring sections engage in said at least one recess.

7. The activation device according to claim 1, wherein said common component is a sleeve.

8. The activation device according to claim 7, further comprising a base and said sleeve is supported on said base.

9. The activation device according to claim 1, wherein said leaf spring elements are made of metal.

10. The activation device according to claim 1, wherein said leaf spring elements are made of spring steel or a polymer.

11. A activatable battery for an electronic ignition mechanism, the activable battery comprising:
    a housing defining a housing interior; and
    an activation device disposed in said housing, said activation device containing:
      a common component disposed in said housing interior;
      an ampoule filled with an electrolyte; and
      a breaking device for breaking said ampoule, said breaking device having two leaf spring elements being fixed with a prestress on said common component and between said leaf spring elements said ampoule is clamped, one of said leaf spring elements supporting said ampoule on a bottom side snapping from a first shape into a second shape when a force due to acceleration is applied;
    said leaf spring elements respectively containing a central disc section and a plurality of spring sections protruding radially therefrom, by means of said spring sections said leaf spring elements are respectively supported on a wall of said common component enclosing said leaf spring elements.

* * * * *